Patented Oct. 20, 1931

1,828,679

UNITED STATES PATENT OFFICE

HENRI PIEPER, OF BRUSSELS, BELGIUM

TRANSMISSION SYSTEM

Application filed March 30, 1927, Serial No. 179,700, and in Belgium April 23, 1926.

The object of the present invention is to provide between a driving member and a driven member a transmission system such that the ratio of the force transmitted changes automatically as soon as the reaction opposed by the driving member has reached a certain value.

To this end the transmission system between the driving member and the driven member comprises a part attached to one of these members and acted on, on the one hand, by an elastic element which is put under tension by the force transmitted, and, on the other hand, by the other member through a hydraulic connection controlled by the tension of the said elastic element which, by its intervention, modifies the transmission ratio.

According to one embodiment the hydraulic connection is obtained through the medium of a liquid enclosed in a vessel which is normally open and which is closed when the above mentioned elastic element undergoes a determined deformation. The elastic element, or the spring which bears upon the above mentioned part, is attached to one of the members, also bearing upon the other member.

The invention also provides for a form of construction wherein the connection or connections between the driving member and the driven member are completely obtained by means of a liquid.

In this embodiment the deformation of the elastic element permits the above mentioned part to produce the displacement of a valve which cuts off the hydraulic connection which thus forms a closed vessel against which the said part bears, while on the other hand the valve establishes communication with a second hydraulic connection through the medium of which the transmission is then effected.

Further characteristic features of the invention will be made clear by the description of the accompanying drawings, given by way of example. In these drawings.

Figure 1:
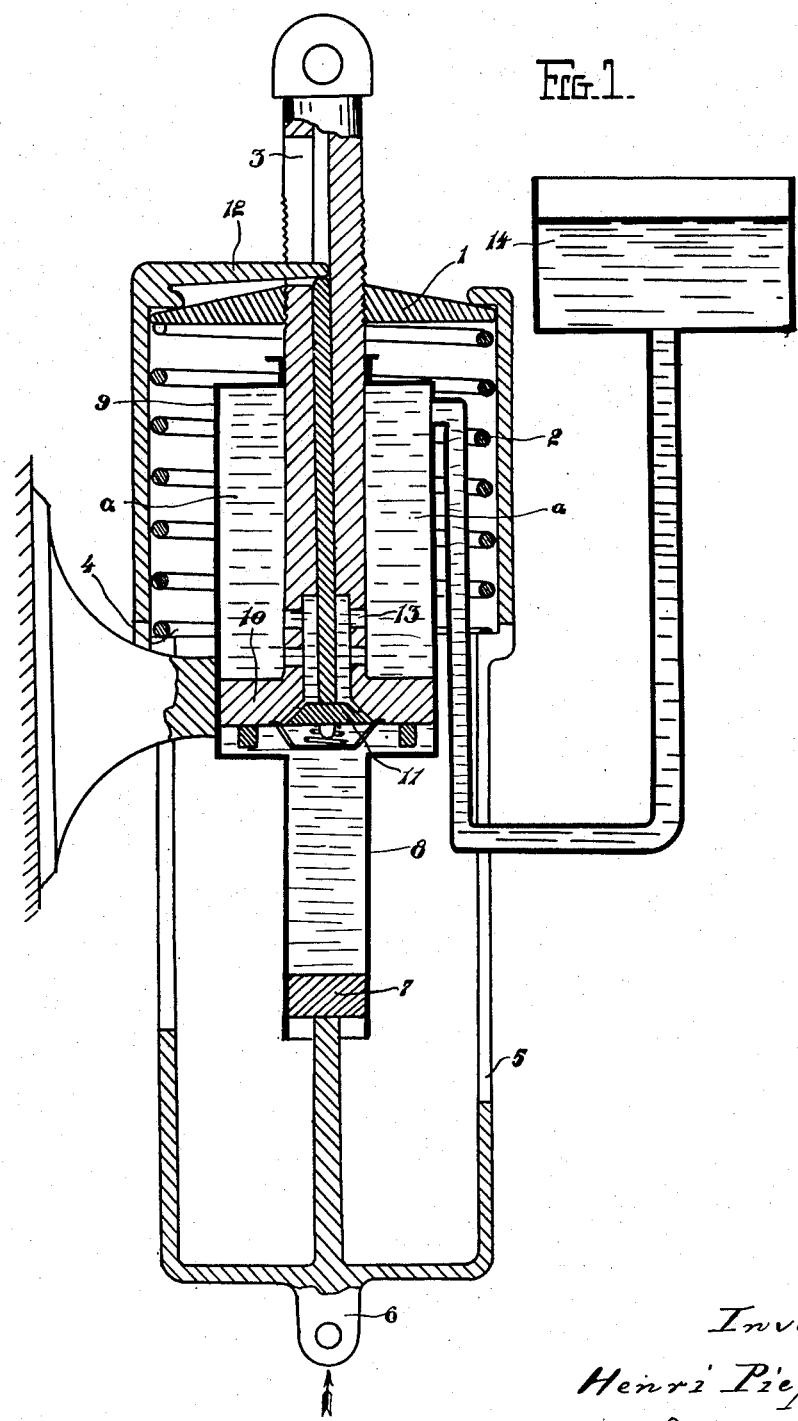
Figure 1 is a vertical sectional view of one form of the invention.

According to the form shown in Fig. 1, the part 1 is attached to the driven member 3 and is subjected to the action of an elastic connection formed by a spring 2 which presses against a shoulder 4 upon a stirrup 5 rigid with the driving member 6.

The stirrup 5 also actuates a piston 7 moving in a cylinder 8 which communicates freely with a cylinder 9 of larger diameter in which moves a piston 10 rigid with the driven member 3.

The enclosed space thus formed between the pistons 7 and 10 can be put into communication with the outside through a valve 11 which is normally held open, by the action of a finger 12 pressing upon the end of the spindle of the said valve. When said valve opens, this space will communicate through ducts 13 with the part $a$ of the cylinder 9 situated on the other side of the piston 10. This part $a$ at the other end communicates freely with a reservoir 14 containing a reserve of liquid; but it is obvious that if the device is employed in a vertical position the cylinder 9 can fulfil the function of the reservoir 14.

If the driving member 6 moves in the direction shown by the arrow, such movement will be directly transmitted through the medium of the stirrup 5 and the spring 2 to the part 1 and said part 1 will move in the same direction and will carry with it the driven member 3. As the pistons 7 and 10 make equal strokes in cylinders of different sections, there is an increase in the volume of the space comprised between them during this movement, with the result that liquid is forced into this space from the space or chamber $a$, the valve 11 being open.

This method of transmission of the force applied to the driving member 6 will continue until the reaction undergone by the spring 2 reaches a value such that the latter undergoes a deformation which will have the effect of compressing it, producing as a consequence a relative displacement between the finger 12 and the end of the spindle of valve 11, which will thus be able to close automatically under the action of its return spring.

From this moment the force will be transmitted through the medium of the pistons 7 and 10 which act after the manner of the press members of a hydraulic press. The driven member 3 will consequently receive an increased force and will on the other hand undergo a smaller displacement than the driving member 6.

The return of the driving member 6 in the opposite direction will first of all produce the displacement of the pistons 7 and 10 until the moment when the spring 2 has expanded sufficiently for the finger 12 to act again upon the end of the spindle of the valve 11 which will again be opened, whereafter the two pistons make equal strokes.

Figure 2:
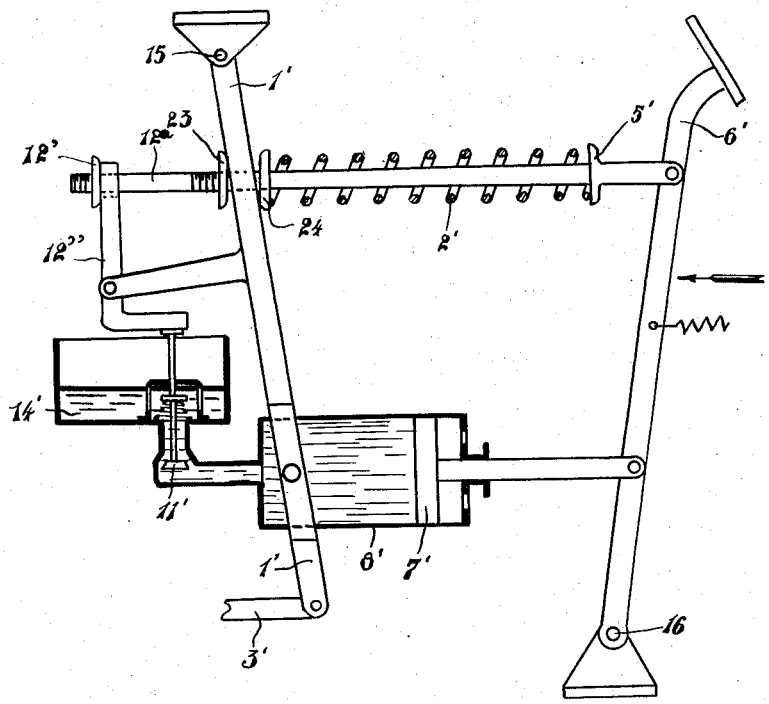
Fig. 2 is a similar view of a second form.

According to the form shown in Fig. 2, the part or lever 1' is pivoted about a fixed point 15 and is adapted to be displaced by the driving member formed by a lever 6'. The latter is pivoted upon a fixed pivot 16 and has secured to it a stirrup 5' which acts upon the lever 1' through the medium of a spring 2'.

The driving member 6' also actuates a piston 7' which normally moves freely in the cylinder 8' pivoted upon the lever 1' and which can act to force the liquid contained in the said cylinder towards a reserve reservoir 14'. In the construction illustrated, the cylinder 8' is mounted to move with lever 1'.

The communication between the reservoir 14' and the cylinder 8' is controlled by a valve 11' which is normally kept open by the action of a mechanism comprising a rod $12^a$ rigid with the stirrup 5' and provided at its other end with an adjustable stop 12' against which abuts a pivoted bell crank lever 12'' which acts upon the end of the spindle of the said valve 11'; the said rod $12^a$ passes freely through the lever 1' and comprises on one side an adjustable stop 23 screwed upon the rod and on the other side a plate 24 serving as a support for the spring 2' and sliding upon the rod $12^a$.

When the lever 6' is displaced in the direction indicated by the arrow, the lever 1' is displaced and, consequently, the driven member 3', directly through the medium of the spring 2' while on the other hand the liquid from the reservoir 14' is drawn into the cylinder 8'.

This method of transmission can continue until the reaction opposed by the driven member 3' and the lever 1' reaches a value such that the spring 2' undergoes a determined compression, the effect of which is to produce the relative displacement of the rod $12^a$ and the lever 1' in such a way that the valve 11' is released by bell crank 12'' and consequently closed by the action of its return spring.

Thereafter, the reservoir 14' and the cylinder 8' are moved toward the piston 7', and the liquid contained in the cylinder 8' acts as an intermediary between the levers 6' and 1' and consequently assists in the transmission of the force between these two parts. It is to be noted that a variation in the transmission ratio will in this case be obtained on account of the different positions upon the levers 1' and 6' of the points of support of the two transmission systems, that is to say, on the one hand the system of transmission by means of spring 2' and on the other hand the system of transmission by means of the piston 7' and the cylinder 8'.

Figure 3:
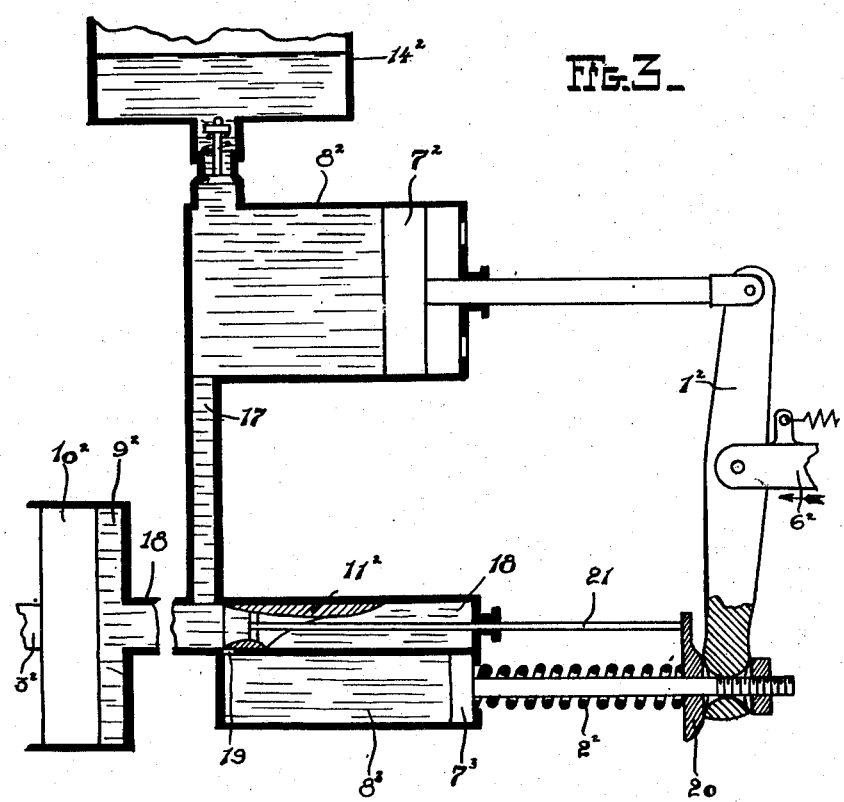
Figs. 3 and 4 are vertical sections of two further forms which make a particular use of the hydraulic connections.

According to the form shown in Fig. 3, the lever $1^2$ secured to the driving member $6^2$ is connected to a piston $7^2$ moving in a cylinder $8^2$ containing a liquid and communicating through ducts 17 and 18 with a cylinder $9^2$ containing a piston $10^2$ rigid with the driven member $3^2$.

The said lever $1^2$ also presses at its other end against a spring $2^2$ which bears against the piston $7^3$ of a second cylinder $8^3$ adapted to be put into communication with the duct 18 through an orifice or port 19.

The lever $1^2$ which is adapted to slide upon the rod of the piston $7^3$ presses upon the spring $2^2$ through the medium of a ring 20 which controls the rod 21 of a slide valve $11^2$ which is normally so placed as to close the port 19 and to establish communication between the ducts 17 and 18.

When the driving member $6^2$ is actuated in the direction shown by the arrow the piston $7^2$ is displaced in the same direction and, in consequence, actuates the piston $10^2$ and the driven member $3^2$ which is rigid with it, until the reaction undergone by the piston $7^2$ and transmitted by the lever $1^2$ to the spring $2^2$ is sufficient to produce the compression of the said spring, thereby causing the displacement towards the left of the ring 20 and the slide valve $11^2$; this displacement of the slide valve $11^2$ closes the duct 17 and then opens the port 19.

Thereafter, the liquid contained in the cylinder $8^2$ and the duct 17 acts as a point of support for the lever $1^2$ which then, by means of the spring $2^2$, displaces the piston $7^3$ in its cylinder $8^3$, thus driving the liquid in that cylinder through the orifice 19 and the duct 18 towards the cylinder $9^2$.

It will be understood that the ratio of transmission of the force may easily be varied by a suitable choice of the diameters of the cylinders $8^2$ and $8^3$ or by varying the point of application of the member $6^2$ upon the lever $1^2$.

Figure 4:
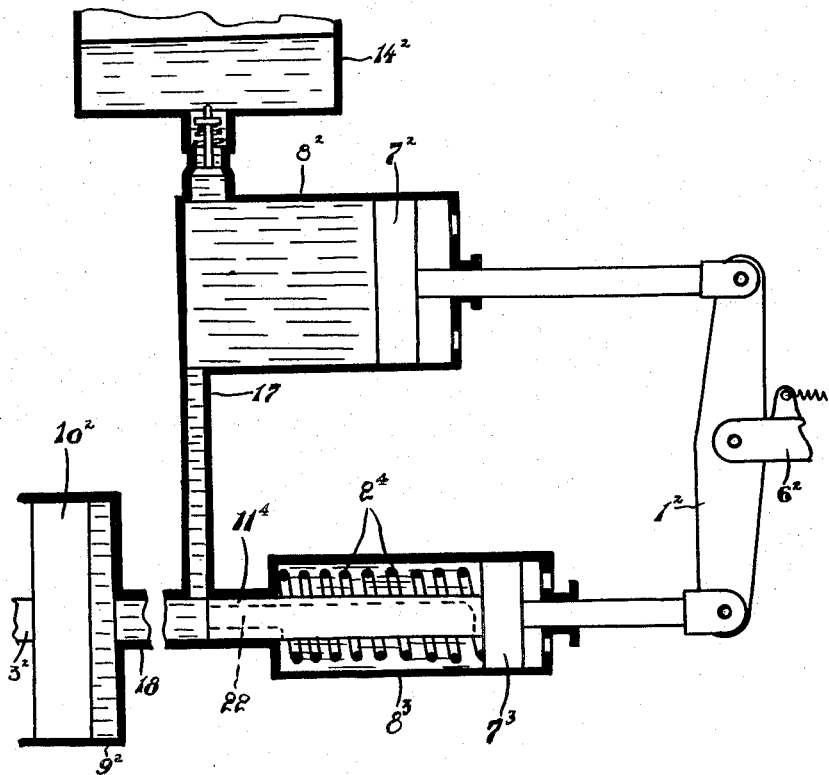

Fig. 4 shows a modification of Fig. 3 according to which the lever $1^2$ is also secured to the rod of the piston $7^3$, which rod is extended beyond the piston so as to form a slide valve $11^4$ which provides a control for the communication between the duct 17 and the duct 18.

The slide valve normally occupies the position shown in the drawings; and when the piston $7^3$ is displaced towards the left, for the reasons stated above, compressing as a consequence the spring $2^4$, the slide valve $11^4$ will close the duct 17, while the duct 18 will be in communication with the cylinder $8^3$ through the medium of a duct 22 which passes axially into the slide valve $11^4$ and opens laterally through the part of the valve situated within the cylinder $8^3$. The construction also includes a reservoir $14^2$ containing liquid and communicating with the installation through an automatic valve closing towards the reservoir. This reservoir is provided for the purpose of making up accidental losses of liquid from the transmission apparatus.

It goes without saying that the various forms of the invention illustrated may undergo numerous constructional modifications and that they may, in particular, be employed for controlling the brakes of vehicles; in which case the driving member will be connected to the brake controlling pedal while the driven member will be connected directly or indirectly to the brake shoe. The forms shown in Figs. 3 and 4 have a particularly advantageous use in hydraulic transmission brake systems, and in that case the cylinder $9^2$ and the piston $10^2$ may be replaced by cylinders housed in the interior of the brake drums, the pistons of which cylinders would act upon the brake block.

The forms shown in the drawings are adapted for use in the case when a large displacement with a small force is first of all produced and then a small displacement with a large force, but the arrangement may naturally be reversed.

What I claim is:—

1. The combination, with companion driving and driven members, of an interposed transmission system comprising: two separate hydraulic connections between said members; an elastic element acting to render one of said connections operative until the resistance opposed by the driven member to motion has reached a predetermined value; and a valve operated by one of said companion members for breaking the said hydraulic connection and simultaneously establishing the other hydraulic connection so as to change the transmission ratio, the operation of said valve being permitted by the deformation of the elastic element.

2. The combination, with companion driving and driven members, of an interposed transmission system comprising: two hydraulic connections between said members, each including a cylinder and a piston working therein; an elastic element acting to render one connection operative until the resistance opposed by the driven member to motion has reached a predetermined value; a valve for breaking the said connection and simultaneously establishing the other connection; a presser member acting at the same time upon the valve and the elastic element; and a lever bearing against said presser member and connected at one point to the driving member and at another point to the piston of the first-named connection.

3. The combination, with companion driving and driven members, of an interposed transmission system comprising: a lever upon which the driving member acts, a liquid-containing cylinder, a piston working in said cylinder and connected at one point to said lever for discharging the liquid from the cylinder to act upon the driven member, a valve for closing the outlet of said cylinder, a device connecting said lever at another point thereof to the driven member, and an elastic element acting to close said valve until the resistance opposed by the driven member to motion by said device has reached a predetermined value, the transmission thereupon being completed at a given transmission ratio.

4. The combination, with companion driving and driven members, of an interposed transmission system comprising: two separate connections between said members, one of which is a hydraulic connection; an elastic element tensioned by the displacement of the driving member; and a valve operated when the said elastic element is deformed and acting to render said hydraulic connection operative and simultaneously to render the other connection inoperative so as to change the transmission ratio, the deformation of the elastic element being permitted until the resistance opposed by the driven member to motion has reached a predetermined value.

5. The combination, with companion driving and driven members, of an interposed transmission system comprising: two separate connections between said members, one of which is a hydraulic connection and includes a cylinder and a piston working therein; an elastic element tensioned by the displacement of the driving member; a valve operated by one of said companion members and acting to render the said hydraulic connection inoperative and thereby simultaneously establishing the other connection so as to change the transmission ratio, the operation of said valve being permitted by the deformation of the elastic element and until the resistance opposed by the driven member to motion has reached a predetermined value; a reservoir of liquid open to the atmospheric pressure; a communication between said reservoir and the cylinder of the hydraulic connection; and a valve in said communication opening toward said cylinder to permit the passage of liquid thereinto to compensate for leakages.

6. The combination, with companion driving and driven members, of an interposed transmission system comprising: two separate connections between said members; an elastic element tensioned by the displacement of the driving member; and a hydraulic device included in one of said connections and controlled by the deformation of the elastic element and acting as a bearing point for the operation of the other connection, such deformation being permitted until the resistance opposed by the driven member to motion has reached a predetermined value.

7. The combination, with companion driving and driven members, of an interposed transmission system comprising: two separate connections between said members, one of which includes a hydraulic device comprising a cylinder filled with liquid, a piston in said cylinder adapted to be moved by the driving member, and means for varying the quantity of liquid in the cylinder when the piston is moved; means for displacing said piston by the operation of the first connection; an elastic element tensioned by the displacement of the driving member; a valve associated with the hydraulic device and acting to render inoperative the means for varying the quantity of liquid in the cylinder and simultaneously to establish the other connection; and means for operating the valve after the elastic element has been deformed, said deformation being permitted until the resistance opposed by the driven member to motion has reached a predetermined value.

In testimony whereof I affix my signature.

HENRI PIEPER.